United States Patent Office 3,328,100
Patented June 27, 1967

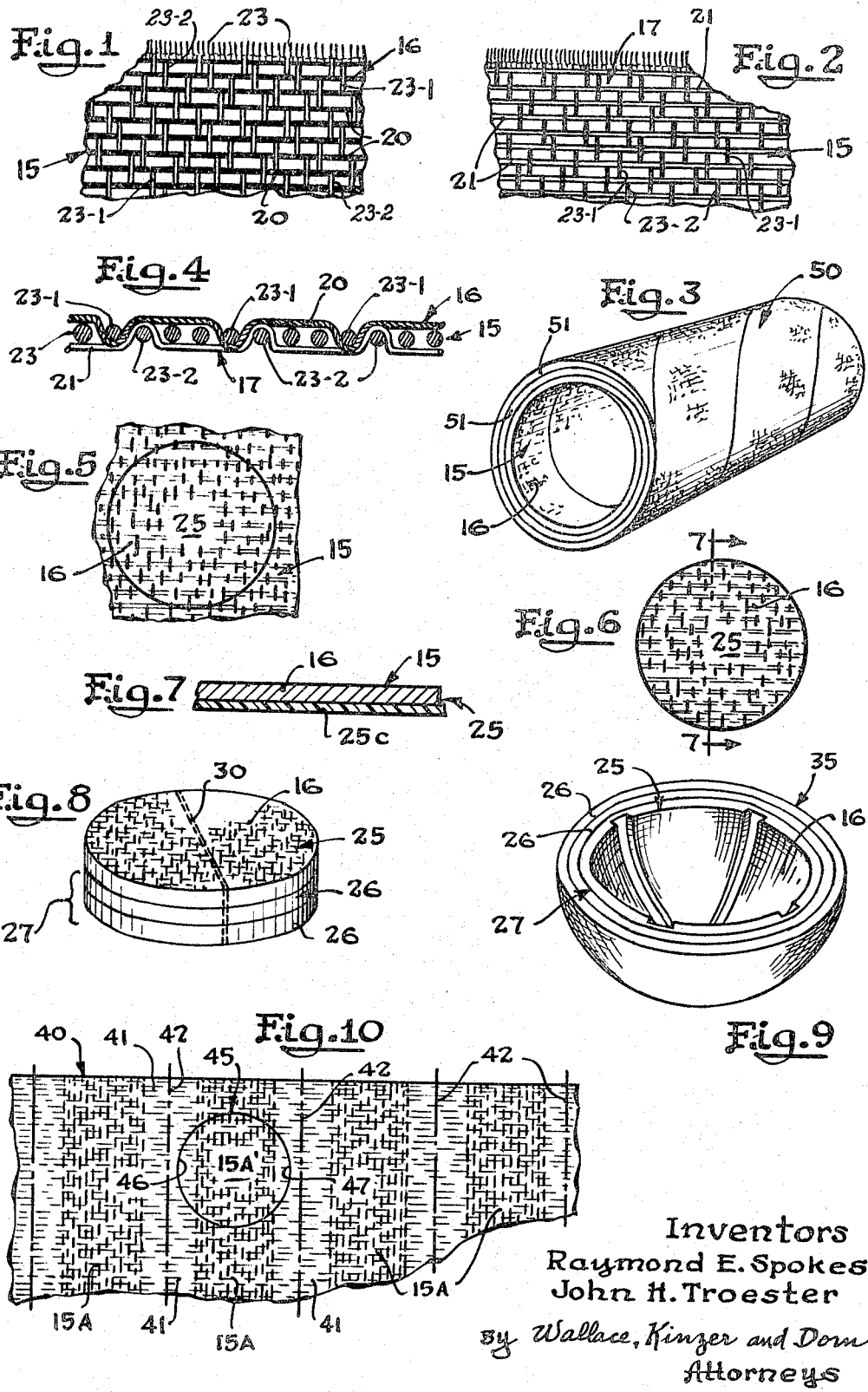

3,328,100
BEARINGS
Raymond E. Spokes, Ann Arbor, Mich., and John H. Troester, Winchester, Va., assignors to Abex Corporation, a corporation of Delaware
Filed Mar. 17, 1964, Ser. No. 352,588
4 Claims. (Cl. 308—238)

This invention relates to a fabric-type bearing particularly adapted for automotive use. This application is a continuation-in-part of application Ser. No. 237,265, filed Nov. 13, 1962, now abandoned.

Automotive manufacturers have in recent years been proposing that automotive vehicles be equipped with ball joints for the front wheel suspensions of such nature that the various shaped bearing elements, including those of cup shape, associated therewith need not be lubricated at all, or need not be periodically lubricated once the initial lubricant, such as grease, has been provided. Other bearings or other low friction elements are also to display this characteristic.

The low friction quality of Teflon resin (polytetrafluroethylene) is well known. However, as a film or a cast continuous surface, Teflon resin per se displays in sufficient compressive strength to prevent cold flow for bearing use involving high pressures experienced in certain types of automotive ball joints under certain expected service conditions, and sometimes during molding of semicircular shapes and the like. It has, therefore, been proposed that a bearing characterized by Teflon resin as one of the low friction materials, for an automotive ball joint or the like, be afforded by a woven fabric including Teflon threads.

The difficulty of Teflon resin to be bonded to most other materials is well known, and it has been proposed as a solution to this problem that a fabric lining for bearing use include Teflon threads interwoven with cotton threads, the latter presenting a material that can be bonded by a thermosetting resin or the like incidental to securing the lining to a support or backing member. However, by interweaving Teflon threads with cotton threads, the Teflon is diluted with high friction cotton fibers at the low friction face, whereas it is desirable to have at the low friction face as much undiluted Teflon as possible in view of the highly desirable low friction properties thereof. By the same token, the unbondable Teflon in the interweaving proposal dilutes the cotton at the other or reverse side of the lining, thereby reducing the percentage of bondable cotton threads in direct proportion to the Teflon content.

An object of the present invention is to afford a fabric-type bearing element including a minimum weight low friction lining characterized by a low friction face or obverse surface virtually 100% by weight of Teflon threads, and a bondable or reverse side virtually 100% bondable threads, such as cotton or the like, and to accomplish this while utilizing a single layer of Teflon threads, which substantially lessens production costs, appreciably affected by the expensive Teflon threads.

The Teflon threads, in any event, are concentrated entirely on one side of the lining, and the bondable cotton threads are concentrated entirely on the opposite side. The two kinds of threads or yarns are tied together by binder warp threads that are of a low friction character and which do not tend unacceptably to bleed bonding resin to the low friction surface as will be described.

Since the Teflon threads are entirely concentrated on one side of the fabric or lining, maximum advantage is taken of this synthetic as having the lowest friction of any resin now available and the greatest load bearing capacity without cold flow of any low friction material, which are highly advantageous characteristics for an automotive ball joint bearing or like bearing installation where unit pressures may be extremely high.

An advantageous consequence of not interweaving Teflon and cotton yarns or threads is that Teflon is not wasted by serpentine bends. In other words, the Teflon threads are practically linear. Another consequence of the foregoing is that the binder threads, being substantially non-absorptive, do not carry deleterious amounts of the bonding resin to the Teflon resin fibers at the low friction face, as resin-absorptive fibers would.

Another object of the present invention is to bond the aforesaid lining to a resilient backing by a thermosetting binder resin containing solid lubricant particles. The binder resin is applied in such a way that only the cotton layer, or equivalent bondable yarns, become impregnated therewith, and the solid lubricant particles in association therewith afford an additional low friction zone in case of unusual bearing lining wear beyond the Teflon resin threads. The binder resin also achieves good bonding contact with a binder resin in the support layer that is behind the lining as will be described.

In other words, in the presence of grease, the thus-impregnated cotton yarns, or layer of bondable material, affords a second low friction zone directly behind the Teflon resin threads.

Another object of the present invention is to make available a low friction bearing element of the fabric type providing a minimum weight of Teflon resin fibers, consistent with full area coverage at the low friction face by Teflon resin, and an opposite face or reverse side of bondable material impregnated with a bonding resin containing particles of a lubricant.

Another object of the present invention is to produce a fabric for bearing linings displaying an optimum or acceptable degree of balanced strength in both warp and fill directions so that there will be a minimum of distortion or disruption during molding of the bearing. This is accomplished as a specific object by employing warp threads selected from the group consisting of Dacron and nylon as a binder between the Teflon and cotton threads.

In the present bearing face construction, the threads of Teflon resin and the threads of cotton, constituting the filler threads, are actually separated from each other by the Dacron or nylon warps, that is, the warp threads also serve to tie in the cotton threads serving as one face of the fabric. These warps thus serving as the binder threads are of such nature as to balance substantially the over-all strength of the filler threads, consisting of cotton and a very thin surface of Teflon threads. The achievement of this balance in strength is another object of the present invention as will be developed in more detail.

Thus it will be seen that under the present invention, the main objects are to:

(1) provide a woven bearing construction consisting of one fabric having a minimum weight, low friction face of non-bondable Teflon fiber consistent with full area coverage and satisfactory wear, and free from cotton fiber; and a reverse or bondable face consisting essentially of cotton, and free from Teflon fiber, all bonded together with low friction warp fibers;

(2) accomplish the foregoing while presenting a fabric displaying optimum thickness of cotton face consistent with desirable impregnation by a thermosetting binder resin containing solid lubricant particles and having good bondability to adjacent fabric plies, thus providing additional long wearing bearing material, and permitting use of a minimum amount of Teflon facing yarns;

(3) fix in position the Teflon and cotton filler yarns respectively by low friction, high tensile strength Dacron or nylon warp yarns in such a manner as to provide a fabric construction substantially balanced in strength and of essentially low friction character.

In amplification of the foregoing it should be stressed that the binder warps offer maximum resistance to fabric distortion both during use and molding; that the low friction face, by weight, is about 95% Teflon resin warps and 5% binder warps; that the thinness of the cotton side of the lining enables the cotton to be penetrated to a maximum extent by the binder resin containing the supplementary solid lubricant; and the binder threads, for locking the Teflon threads, being substantially non-absorptive to the bonding resin, eliminates bonding resin interference at the synthetic low friction face.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a fragmentary view of the front or low friction side of a piece of fabric used to construct the lining of a bearing under the present invention;

FIG. 2 is a fragmentary view of the opposite or bondable side of the fabric shown in FIG. 1;

FIG. 3 is a view illustrating one source of preforms to be molded;

FIG. 4 shows the nature of the weave employed for the aforesaid fabric;

FIG. 5 is a fragmentary view illustrating the manner in which a section of the aforesaid fabric as a web is cut to afford a bearing element to be molded;

FIG. 6 is a view of a preform separated from the web fragment shown in FIG. 5;

FIG. 7 is a sectional view on the line 7—7 of FIG. 6;

FIG. 8 shows an assembly of preforms to be molded;

FIG. 9 shows a molded bearing; and

FIG. 10 is a view showing a variation in obtaining bearing linings from a piece of fabric.

THE BEARING FABRIC OR LINING

The lining 15 characterizing the low friction element of the present invention includes a low friction side 16 characterized by a single ply or thickness of Teflon threads 20, and a bondable or reverse side 17, characterized by a single ply of cotton threads 21. The two layers, as will be particularly evident in FIG. 4, represent the filling threads of the fabric, the threads 20 and 21 being parallel to one another, and the layers are joined by wrap threads 23. The warp threads are one of the synthetics, Dacron or nylon, which will produce a warp strength in the fabric substantially equal to the filling strength of the Teflon threads, thereby resulting in a fabric that will not distort to an unacceptable degree when being molded as hereinafter explained.

The following are specifications for the threads (or so-called yarns) for the fabric lining 15 when the binder warps are of nylon:

*Example 1*

| | | |
|---|---|---|
| Weight of fabric per square yard | oz__ | 10.47 |
| Thickness | in__ | 0.0189 |
| Count: | | |
|     Warp threads | in__ | 57½ |
|     Filling threads | in__ | 85½ |
| Warp (42 ½ picks): | | |
|     Nylon | denier__ | 210 |
| Filling (42½ picks each of): | | |
|     Cotton | | #24 |
|     Teflon | denier__ | 1200 |
| Composition (by weight): | | |
|     Nylon | percent__ | 15.4 |
|     Teflon | do____ | 71.0 |
|     Cotton | | 13.6 |
| Yarns (threads): | | |
|     Nylon | | Single ply |
|     Teflon | | Single ply |
|     Cotton | | Single ply |
| Yarn weights (per square yard): | | |
|     Nylon | oz__ | 1.71 |
|     Teflon | oz__ | 7.34 |
|     Cotton | oz__ | 1.42 |
|     Total | oz__ | 10.47 |
| Tensile: | | |
|     Warp | pound__ | 194.0 |
|     Filling | do____ | 163.5 |
| Elongation: | | |
|     Warp | percent__ | 38.0 |
|     Filling | do____ | 32.5 |

In weaving the fabric 15 the Teflon threads are plain woven and the cotton back is woven as 3 x 1 twill, as will now be described.

The cotton yarns 21 are quite large in diameter in comparison to the Teflon yarns or threads 20. Preferably the nylon threads 23 are quite large in diameter to withstand solubility in any free phenol that may be present in the bonding resin subsequently used. The Teflon and cotton yarns are separated into two thin, distinct layers by the nylon warps 23, and the nylon warps are actually used to bind or join the two filling layers, such being represented by the warps as 23–1 and 23–2 which lap the underside of the cotton yarns, and the tops of the Teflon yarns as a bunch.

In this connection, it may be noted that the Teflon and nylon yarns each embody many filaments or ends. The nylon warp threads or yarns are for the purpose of assuring a strength in the warp direction approximately the same as the strength in the filling direction that is imparted by the strong Teflon threads.

Advantageously, before weaving the fabric, the cotton yarns are scoured and bowked to enhance their ability to be wetted or penetrated by the thermosetting bonding resin hereinafter referred to. To this end, the cotton threads or yarns are first scoured in a soap bath, and then rinsed, to remove surface dirt and other surface occlusions. The scoured yarns are next bowked to remove the natural motes, waxes and greases. The bowking treatment consists of boiling the cotton yarns 4 to 6 hours in a dilute caustic bath (while maintaining volume) followed by a rinse in dilute acetic acid to remove or neutralize any remaining caustic; and then a rinse in water to remove the acid. The dilute caustic bath and proportions are: Sodium hydroxide, 15 grams; pine oil soap, 2 grams; water, 1 liter.

The fabric lining 15 for the bearing is coated on its reverse or bondable side 17 with a viscous, solvent-free phenol formaldehyde bonding resin containing dispersed particles of a solid lubricant such as graphite, molybdenum sulfide or the like. This bonding resin in its applied state is advanced by heating to a B-stage cure as one assurance against bleeding to the Teflon threads during final molding, as set forth in more detail hereinafter. Moreover, this resin will penetrate and adhere not only to the cotton threads but will adhere to the nylon threads as well. Hence it follows that the reverse side of the fabric 17 is 100% threads bondable by, that is, adherable to, a thermosetting bonding resin.

Being solvent-free, and additionally conditioned as hereinafter explained, the resin will not, to any marked degree, bleed to the Teflon surface of the lining where the lubricant particles will eventually be sloughed off as contaminants, and the presence of which could interfere with the markedly low frictional properties of the woven Teflon face. In other words, the particles of solid lubricant in the bonding resin are restricted to and concentrated at the bondable or cotton side of the lining where they transform the bondable threads into a low friction zone that will display good low friction properties in conjunction with the initial grease or other initial lubricant in the manufactured and installed original bearing assembly. Thus, the resin and solid lubricant particles penetrate the bondable yarns including cotton yarns and become anchored therein as a permanent part of the lining.

The following is a specification for the solvent-free phenol formaldehyde resin, which can have solid lubricant particles added thereto in the desired amount, say colloidal or micron-sized graphite up to 4% by weight of the resin; this same resin may be applied to the fabric facing specified under Example 3 below.

*Example 2*

| | |
|---|---|
| Viscosity at 25° C. _____centistokes__ | 1600–3600 |
| Specific gravity _____ | 1.22–1.24 |
| Non-volatile content _____Percent__ | 80–85 |
| Polymerization at 121° C. _____minutes__ | 22–24 |

A resin of the above viscosity requires application by a so-called doctor-blade, or roller coating to the bondable side 17 of the fabric 15. Advantageously, the procedure is controlled so that the fabric will pick up and hold about 19% of the graphited resin, by weight of the fabric. Thus, by using a solvent-free resin and controlling the viscosity and quantity as above described the resin does not penetrate to the low friction side of the fabric 15. After the resin is applied, it is converted to the B-stage by heating the coated fabric at 220° F. for about five minutes to produce a volatility of about 1.7–2.7%.

The web thus treated with the bonding resin is quite stiff and therefore can then be die cut to produce circular preform buttons or so-called dinks 25, FIGS. 5 and 6, presenting a coating 25C, FIG. 7, of the resin. Alternatively, the web can be sliced into ribbons which may be conformed into so-called preforms. Such die cutting without the stiffness afforded by the resin would be quite difficult, since otherwise the Teflon tends to fray or curl. It may be noted that other geometrical shapes may be used as circumstances require, and various methods may be used for slitting or otherwise severing preforms of the desired shape from the resin-coated stock, such as the coated stock 15.

The preform 25 represents the lining of the bearing element. This is to be supported by one or more pieces of fabric making up the backing of the bearing element. By resorting to such a laminated construction, it is possible to achieve very accurate control over the thickness of the bearing element that includes the lining as 25 and the backing. Such mode of thickness control has been found by one automotive manufacturer to be more accurate in comparison to having the entire fabric bearing element consisting of a single woven thickness, wherein thickness is controlled by the weave. Thus, the preform 25 may be assembled with one or more fabric backing layers 26, FIG. 8, having the geometry of the lining 25. The preforms 26 for the backing 27 are obtained in the manner hereinafter described. The assembly of preforms 25 and 26, FIG. 8, are joined by a stitch 30 of low friction material, and the assembly as such may be handled as a unitary body and placed in a mold incidental to completing formation of the bearing element, such as that shown in FIG. 9.

Particularly in the instance of semi-spherical cup-shaped bearings of the kind illustrated at 35 in FIG. 9, there may be relatively little bearing compression at the diameter extremities or equator. In such areas, it is not essential that the lining display a great deal of anti-friction quality. It is therefore possible under such circumstances to obtain the disc-like preform elements for the lining from fabric material of the kind illustrated in FIG. 10.

Thus, the fabric web 40, FIG. 10, is so formed on the loom as to have strips 15A identical to the weave (15) illustrated in FIG. 4 alternating with 100% pure nylon, Dacron or cotton stripes 41 as may be preferred or required for a particular type of installation. In fact, the stripes 41 can be any preferred material bondable by the thermosetting resin.

The web or sheet 40 can be slitted along the dotted lines 42 resulting in corresponding ribbons from which can be cut circular preform buttons 45 of which the major area consists of a portion 15A′ of the woven stripe 15A (having the Teflon threads 20 and the cotton threads 21 joined by the binder warps 23) bordered by two segments 46 and 47 that are of the purity mentioned. Such configuration substantially reduces the requirement for expensive Teflon.

Another, and in fact preferred, facing is one similar to that described above, except Dacron yarns are used for the warp, thereby avoiding any problem of possible solubility in free phenol that may be present in the bonding resin. The following example applies:

*Example 3*

| | |
|---|---|
| Weight of fabric per square yard _____oz__ | 10.57 |
| Thickness _____in__ | 0.0186 |
| Count: | |
|     Warp threads _____in__ | 55½ |
|     Filling threads _____in__ | 89½ |
| Warp (4 Hardness Satin weave, 45 picks): | |
|     Dacron _____denier__ | 220 |
| Filling (4 Hardness Satin weave, 45 picks each of): | |
|     Cotton _____ | #24 |
|     Teflon _____denier__ | 1200 |
| Yarns (threads): | |
|     Dacron _____ | Single ply |
|     Teflon _____ | Single ply |
|     Cotton _____ | Single ply |
| Yarn weight per square yard: | |
|     Dacron _____oz__ | 1.78 |
|     Teflon _____oz__ | 7.39 |
|     Cotton _____oz__ | 1.40 |
|     Total _____oz__ | 10.57 |
| Tensile: | |
|     Warp _____pounds__ | 175.5 |
|     Filling _____do____ | 162.0 |
| Elongation: | |
|     Warp _____percent__ | 25.0 |
|     Filling _____do____ | 30.0 |

The same type of physical weave (FIG. 4) is employed for the fabric of Example 3 as was employed for the fabric of Example 1. Moreover, what is described herein in connection with the fabric that employs nylon warps 23 applies equally well to the fabric of Example 3 that employs warps of Dacron synthetic, and can be united to the backing as hereinafter described.

THE BACKING

The particular fabric to be selected for the backing preforms as 26 mentioned above depends of course upon the specific application. A heavy-duty fabric is preferred such as an Army duck which is cotton fabric subscribing to the following specification:

*Example 4*

Weight per square yard—12.55 oz.
Yarn size—Warp 10/3 ply; Fill 12/2 ply.
Ends per inch—48; picks per inch—36.
Tensile strength—Warp 250 lbs.; Fill 145 lbs.

Army duck is a firmly woven, plain weave cotton fabric. A plain weave affords the tightest possible interlacing between the warp and filling yarns. In any event, the fabric for the backing is impregnated with an alcoholic solution of a bonding resin subsequently advanced to the B-stage. This resin binder preferred is a conventional alcoholic solution of a phenol-aldehyde resin composition ordinarily used for laminating purposes. Equivalent thermosetting resins can of course be used, and a phenolic is exemplary in all occurrences herein. The backing provides, through the number of laminate, accurate control of the thickness of the entire fabric bearing assembly as noted, and the rear surface of the final backing layer can be treated with one of several proprietary grades of rubber-resin adhesives in order to establish a bond under heat and pressure of the entire laminated fabric bearing structure to a metal support, such as the support cup of an automotive ball joint.

The following is a specification of a phenol-formaldehyde resin that may be used to coat the fabric for backing layers such as 26 and 27 mentioned above.

*Example 5*

Specific gravity—1.060 to 1.065 at 25° C.—60% non-volatile in denatured alcohol.
Resin content—60%, plus or minus 1% in ethyl alcohol by ASTM D115–41 non-volatile test, or by cure loss test (a) hereunder.
Volatility—(a) Cure loss: 40% plus or minus 1%, two hours at 160° C. Two closed top crucibles suspended in electric oven. (b) Loss at 315° C.: 6% maximum, using one cure loss crucible from (a) heated for one hour. (c) Loss at 370° C.: 11% maximum, using second cure loss crucible from (a) heated for one hour.
Viscosity—350 to 450 centipoises at 25° C.
Hot plate set time—20 to 30 seconds at 160° C.

A resin of the kind specified above is mixed with a solvent and particles of a solid lubricant as follows:

*Example 6*

| Material | Parts by weight, lbs. |
|---|---|
| Resin (as specified above) | 234 |
| Alcohol solvent | 13.6 |
| Graphite (2 to 4 microns) | 10.0 |

After the liquid system containing the above materials has been pre-mixed, this is then utilized for coating the web of cotton duck. This is accomplished by applying the resin of Example 6 to a web of the aforementioned Army duck after which this resin is advanced by heat to a suitable bonding B-stage. Preforms as 26, FIG. 8, are then cut therefrom.

Thus, individual fabric plies as 26 may be obtained from the resin coated backing web, such having the geometry of the lining as 25, as shown for example in FIG. 8 The assembly of laminae including the lining 25 and the backing pieces as 26 can be molded and bonded together in a final stage mold and cure process as hereinafter specified, bonding being facilitated by the flowable B-stage resin on the adjacent surfaces of the fabric pieces which compose the preform assembly as a whole.

Thus, a bearing or equivalent low friction element under the present invention will include at least two essential elements from a structural standpoint, namely, the lining represented by the fabric 15 (whether woven with nylon warps or Dacron warps as above described) and the backing as 27, FIGS. 8 and 9, represented by one or more layers of cotton duck or the like coated with a bonding resin.

The outer or exposed surface of the outermost ply in the backing 27 may be coated with a thermosetting cement (e.g. the proprietary Plastilok or Cycleweld cements) that will bond to metal, esepecially where the bearing is to be retained in a metal support cup such as a ball joint.

A preferred, economical way of affording preforms for final molding may be explained in connection with FIG. 3. A strip of resin-coated lining 15 of the character illustrated in FIGS. 5 and 7 (Dacron or nylon warps) is wound spirally in tube form 50 together with one or more strips 51 of resin-coated backing material of the cotton duck type specified above. These are subjected to a preliminary cure to integrate the strips into a stiff tube, in which the inner diameter presents the low friction face 16. Thereafter, cylinders are cut from the tube, and these can then be deformed and shaped in a suitable die or mold, under final heat and pressure of the order described above, to afford a bearing element having the geometry of the bearing element shown in FIG. 9.

MOLDING

The backing, of whatever number of plies, and the lining are assembled as a preform (see FIG. 8) in a mold having the desired configuration for the bearing element. A common example is a socket type liner for an automotive ball joint suspension. In any event, the backing material and the lining material are arranged in the mold so that the Teflon yarns 20 will be present at the low friction surface of the resultant bearing or like low friction element. Thereafter, the mold is closed and the laminae are pressed at 4500 p.s.i, or more if necessary (one ton per square inch) for about 5–10 minutes and 310–325° F. The time and temperature will vary depending upon the thickness of the laminae. This results in penetration of the flowable "B" stage phenolic resin in an equivalent stage, into the interfaces of the plies in the backing, while at the same time bonding the backing to the cotton side of the lining that bears the solvent-free lubricant-containing thermosetting bonding resin 25C. At the time of molding, the "B" stage resin should have a flow factor of only 0.2 to 0.3% at 21,500 p.s.i.

Resultantly, the backing and lining become united by way of the homogeneous bond represented by the phenolic or equivalent thermosetting resin. A unitary body is produced, and if, after installation and prolonged use, the Teflon yarns should be worn through to the point where the cotton warns of the lining are exposed, these will nevertheless display low friction characteristics because of the graphite present in association with the initial grease or other lubricant packed into the bearing joint at the time of manufacture.

CONCLUSION

The present invention affords a bearing or similar low friction element characterized by a low friction lining in which resin-unbondable Teflon yarns in a single layer or ply are confined to one side, with the resin-bondable yarns confined to the reserve side of the lining so that the dissimilar yarns do not interfere functionally with one another. The bondable yarns are bondable to a support backing through use of a solvent-free thermosetting resin, such as a phenolic resin, which assures that the bonding resin will not bleed appreciably to the low friction surface during application, subsequent molding and ultimate use.

This is made possible by separating the filler yarns with warps of a synthetic low friction fiber in the form of Dacron (preferred) or nylon, and some of the warps are used as binders as described. The warps, because of their high tensile strength, establish substantially equal strength in both warp and fill directions.

The bondable cotton threads or yarns alone are penetrated by the resin containing fine particles of a solid lubricant, which is to say that the state of this resin is such that it does not bleed or extend to the Teflon resin woven fibers of the opposite face. As a consequence, the lining presents a second zone which will display low friction character in the presence of grease or other initial lubricant, should the impregnated cotton yarns even be exposed during the life of the bearing. The binder warps, being of low frictional material do not detract appreciably from the low friction character of the Teflon yarns. Particularly in the instance of Dacron, it is found in actual test that the friction unexpectedly remains constant throughout what is considered to be a maximum endurance performance test by a major domestic automobile manufacturer.

A fabric backing of one or more layers is preferred in order to afford a resilient backing for the lining and to achieve fine control over bearing thickness, and while a preferred form of backing, single ply or otherwise, has been described, this clearly is capable of variation. Hence, while preferred embodiments of the invention have been illustrated and described, it is to be understood, that these are capable of variation and modification, and we therefore do not wish to be limited to the precise details set forth, but desire to avail ourselves of such changes and alterations as fall within the purview of the following claims.

We claim:

1. In a bearing element of predetermined thickness, a bearing lining presenting a low friction side characterized by a single layer of filler yarns virtually all polytetrafluoroethylene, and a reverse bondable side preventing a single layer of filled yarns virtually all of a material bondable by a thermosetting resin, the yarns on the two sides of the bearing lining being substantially parallel to one another, said yarns on the two sides of the bearing lining being joined by a single layer of warp yarns of another material extending transverse thereto and which impart substantially equal strength to the lining in the warp and fill directions, and a fabric backing of separate multiple layers supporting the lining, each backing layer comprising interwoven cotton yarns of a tight, plain weave treated with a thermosetting resin that bonds the backing to the reverse bondable side of the lining, whereby the tight plain weave for the backing layers enables more accurate thickness control to be realized in comparison to a bearing element of the same thickness woven in a single thickness from said bondable yarns, said warp yarns and said polytetrafluoroethylene yarns.

2. A bearing element according to claim 1 wherein the bondable filler yarns are cotton yarns coated with a bonding material for bonding the bearing lining to the backing.

3. A bearing element according to claim 2 wherein the bonding material contains particles of solid lubricant.

4. A bearing element according to claim 1 wherein the lining has the yarns thereof present as a stripe substantially in the center thereof, said stripe being bordered on opposite sides by the named yarns in the lining other than polytetrafluoroethylene.

References Cited

UNITED STATES PATENTS

| | | | |
|---|---|---|---|
| 2,089,070 | 8/1937 | Regout | 139—413 |
| 2,322,771 | 6/1943 | Palm. | |
| 2,581,301 | 1/1952 | Saywell | 308—238 X |
| 2,600,321 | 6/1952 | Pyle. | |
| 2,804,886 | 9/1957 | White. | |
| 2,835,521 | 5/1958 | White. | |
| 2,838,436 | 6/1958 | Clingman | 287—90 X |
| 2,862,283 | 12/1958 | Rasero. | |
| 2,906,569 | 9/1959 | Runton | 308—238 |
| 2,906,573 | 9/1959 | Runton | 308—238 |
| 2,907,612 | 10/1959 | White. | |
| 2,908,532 | 10/1959 | Runton | 308—238 X |
| 2,919,219 | 12/1959 | Smith. | |
| 3,053,592 | 9/1962 | Runton | 308—238 |
| 3,075,279 | 1/1963 | Haltnen. | |
| 3,101,961 | 8/1963 | White. | |
| 3,151,961 | 9/1964 | Griffith. | |

MARTIN P. SCHWADRON, *Primary Examiner.*

DAVID J. WILLIAMOWSKY, *Examiner.*

L. L. JOHNSON, *Assistant Examiner.*